United States Patent
Barone et al.

(10) Patent No.: US 12,550,914 B2
(45) Date of Patent: Feb. 17, 2026

(54) WHEY-BASED NUTRITIONAL COMPOSITIONS FORTIFIED WITH CALCIUM

(71) Applicant: SOCIETE DES PRODUITS NESTLE S.A., Vevey (CH)

(72) Inventors: Giovanni Barone, Cork (IE); Alan L. Kelly, Cork (IE); James A. O'Mahony, Cork (IE); Jonathan O'Regan, Killarney (IE)

(73) Assignee: Societe des Produits Nestle S.A., Vevey (CH)

(*) Notice: Subject to any disclaimer, the term of this patent is extended or adjusted under 35 U.S.C. 154(b) by 549 days.

(21) Appl. No.: 17/753,764

(22) PCT Filed: Sep. 15, 2020

(86) PCT No.: PCT/EP2020/075695
§ 371 (c)(1),
(2) Date: Mar. 14, 2022

(87) PCT Pub. No.: WO2021/052925
PCT Pub. Date: Mar. 25, 2021

(65) Prior Publication Data
US 2022/0378064 A1 Dec. 1, 2022

(30) Foreign Application Priority Data
Sep. 16, 2019 (EP) ..................... 19197631

(51) Int. Cl.
*A23J 1/20* (2006.01)
*A23C 21/10* (2025.01)
(Continued)

(52) U.S. Cl.
CPC .............. *A23J 1/205* (2013.01); *A23C 21/10* (2013.01); *A23L 33/165* (2016.08); *A23L 33/19* (2016.08); *A23L 33/40* (2016.08)

(58) Field of Classification Search
CPC ........ A23L 33/165; A23L 33/40; A23L 33/19; A23L 33/16; A23L 2/66; A23C 21/10;
(Continued)

(56) References Cited

U.S. PATENT DOCUMENTS 6,312,755 B1 11/2001 Wu
2018/0317513 A1 11/2018 Li et al.

FOREIGN PATENT DOCUMENTS

CN 1911063 A 2/2007
CN 104472852 4/2015
(Continued)

OTHER PUBLICATIONS

Chinese Office Action for Appl No. 202080064617.3 dated Jul. 31, 2023.
(Continued)

*Primary Examiner* — Subbalakshmi Prakash
(74) *Attorney, Agent, or Firm* — K&L Gates LLP

(57) ABSTRACT

The invention concerns whey-based nutritional compositions fortified with calcium that are suitable for infant nutrition, including infant formula (IF) and growing up milk (GUM). The nutritional compositions are based on α-lactalbumin enriched whey protein concentrate that has been fortified with calcium.

15 Claims, 3 Drawing Sheets

(51) Int. Cl.
*A23L 33/00* (2016.01)
*A23L 33/165* (2016.01)
*A23L 33/19* (2016.01)

(58) Field of Classification Search
CPC .............. A23C 21/06; A23J 1/205; A23V 2250/54252; A23V 2250/1578
USPC ....................................................... 426/656
See application file for complete search history.

(56) References Cited

FOREIGN PATENT DOCUMENTS

| | | |
|---|---|---|
| EP | 0604684 A1 | 7/1994 |
| JP | 2011067148 A | 4/2011 |
| WO | 2003055332 A1 | 7/2003 |
| WO | 2005053436 | 6/2005 |
| WO | 2006058083 | 6/2006 |
| WO | WO-2018009647 A1 * | 1/2018 ............. A23L 33/00 |
| WO | 2018202636 | 11/2018 |

OTHER PUBLICATIONS

Fernández et al., "α-Lactalbumin Solubilisation From a Precipitated Whey Protein Concentrates Fraction: pH and Calcium Concentration Effects", International Journal of Food Science & Technology, vol. 47, Issue No. 03, 2012, pp. 467-474.

Bratcher et al., "Metal Ion Binding to the N and A Conformers of Bovine α-Lactalbumin", The Journal of Biological Chemistry, vol. 259, Issue No. 17, Sep. 10, 1984, pp. 10875-10886.

Lönnerdal et al., "Calcium Binding by α-Lactalbumin in Human Milk and Bovine Milk", The Journal of Nutrition, vol. 115, Issue No. 09, 1985, pp. 1209-1216.

Liu et al., "Moisture-Induced Aggregation of Alpha-Lactalbumin: Effects of Temperature, Cations, and pH", Journal of Food Science, vol. 76, Issue No. 06, 2011, pp. C817-C823.

Bramaud et al., "Optimisation of a Whey Protein Fractionation Process Based on the Selective Precipitation of α-Lactalbumin", Lait, vol. 77, Issue No. 03, 1997, pp. 411-423.

Patocka et al., "Calcium Association With Isolated Whey Proteins", Canadian Institute of Food Science and Technology Journal, vol. 24, Issue No. 05, 1991, pp. 218-223.

European Notice of Opposition for Application No. 20768623.9-1105 dated Nov. 26, 2024, 14 pages.

Marella et al., "Application of Membrane Separation Technology for Developing Novel Dairy Food Ingredients", Journal of Food Processing & Technology, vol. 4, Issue No. 9, 2013, pp. 1-5.

Motulsky et al., "Law of Mass Action", GraphPad Curve Fitting Guide, Mar. 27, 2025, 2 Pages.

Allen et al.,"Guidelines on Food Fortification with Micronutrients", World Health Organization, 2006, 23 Pages.

"Whey Protein Concentrate (WPC) Standard", Wayback Machine, Jun. 25, 2017, p. 16.

Griko et al., "Energetics of Solvent and Ligand-Induced Conformational Changes in α-Lactalbumin", Protein Science, vol. 8, 1999, pp. 554-561.

European Office Action for Appl No. 20768623.9-1105 dated Jul. 4, 2025, 11 pages.

* cited by examiner

WHEY-BASED NUTRITIONAL COMPOSITIONS FORTIFIED WITH CALCIUM

CROSS REFERENCE TO RELATED APPLICATIONS

The present application is a National Stage of International Application No. PCT/EP2020/075695, filed on Sep. 15, 2020. which claims priority to European Patent Application No. 19197631.5, filed on Sep. 16, 2019, the entire contents of which are being incorporated herein by reference.

TECHNICAL FIELD

The invention concerns whey-based nutritional compositions fortified with calcium that are suitable for infant nutrition, including infant formula (IF) and growing up milk (GUM).
Preamble
A large proportion of the global population does not consume the recommended daily intake (RDI) of calcium (Ca), with repercussions for human health. Ca deficiency can lead to disorders that can affect many organs and physiological functions. In particular, Ca is required for normal growth and development of infants and young children.

Many technological and formulation challenges exist when fortifying dairy based nutritional compositions with insoluble or soluble Ca salts, or indeed, with combinations of both. Soluble Ca salts commonly used in the fortification of IF and GUM compositions include calcium lactate, chloride and gluconate, but their addition to the nutritional formulations often has deleterious effects on the heat stability and pH stability of the system during processing, as well as the potency of the Ca salt. This instability may lead ultimately to protein aggregation and gelation, thereby making the manufacturing of an acceptable nutritional composition challenging.

On the other hand, for insoluble Ca salts, such as calcium carbonate, phosphate and citrate, their addition to nutritional formulations often leads to organoleptic defects such as chalkiness and sedimentation.

Generally, incorporation of additional calcium may have a negative effect on solubility for nutritional compositions that are supplied as powders destined to be reconstituted with water, as in the case, for example, with infant formula.

Furthermore, the efficacy of minerals, including Ca, is affected by the concentration of said mineral present in the biological system, and this is largely determined by absorption and transport. Dietary absorption is considered to be the major factor affecting Ca bioavailability. For example, the presence in some food matrices of components such as phytates and oxalates constitutes a major dietary impediment to the uptake of divalent metals including Ca, as these metal chelators form insoluble Ca complexes, rendering such minerals unavailable, as there is a lack of phytate-hydrolyzing enzymes in the human gastrointestinal tract [Holm, P. B.; et al., *Transgenic approaches in commonly consumed cereals to improve iron and zinc content and bioavailability*. J. Nutr. 2002, 132, 514S-516S]. It is challenging to recover free Ca from such complexes and Ca deficiency can occur.

Therefore, a seemingly adequate intake of dietary Ca may still pose some concern because an inadequate amount can be absorbed in the small intestine, due to precipitation and formation of insoluble salts in the neutral to the slightly basic intestinal lumen.

One solution to ensure sufficient Ca intake has been to co-administer Vitamin D with Ca salts, which can enhance Ca absorption, as well through the activation of calbindin-D9k, a membrane-bound calcium transporter. An alternative approach has been to fortify nutritional compositions with commercially available casein phosphopeptides (CPPs) derived from milk proteins. The treatment of casein proteins with trypsin or chymotrypsin releases CPPs which are mostly known for their ability to bind calcium [Donida, B. M. et al. *Casein phosphopeptides promote calcium uptake and modulate the differentiation pathway in human primary osteoblast-like cells*. Peptides 2009, 30, 2233-2241], but also iron and zinc. CPPs possess different chelating capacities depending on the particular casein sub-units from which they are released. For example, the uptake of iron complexed to CPPs from β-casein was higher than from a $\alpha\text{-}_{S1}$-CPPs-iron complex [Kibangou, I. B.; et al., *Milk proteins and iron absorption: Contrasting effects of different caseinophosphopeptides*. Pediatr. Res. 2005, 58, 731].

Therefore, it remains challenging to develop nutritional compositions that meet formulation and consumer requirements and that provide Ca in a way that is most beneficial to the consumer, in particular, to infants and young children.

There still exists a need to provide Ca fortified nutritional compositions that have acceptable organoleptic and physicochemical properties, including pH and heat stability. There still exists a need to provide Ca fortified nutritional compositions that have sufficient solubility to be easily reconstituted with water, as in the case, for example, with infant formula supplied to the consumer in the powder form. There still exists a need to provide Ca fortified nutritional compositions and that, when administered, can deliver biologically available Ca.

The need exists to provide valuable nutritional compositions suitable for administration to infants and young children.

The present inventors have developed a calcium-fortified, dairy-based nutritional ingredient for use in nutritional compositions, in particular, in infant formulae (IFs) and growing up milks (GUMs), for administration, in particular, to infants and young children. The nutritional compositions comprising the calcium fortified dairy-based nutritional ingredient provide high levels of bioavailable calcium.

SUMMARY OF THE INVENTION

In a first aspect, the invention concerns a calcium fortified α-lactalbumin enriched whey protein concentrate (α-lac WPC), wherein at least 80% of the proteins' calcium binding sites are occupied by calcium ions.

According to one embodiment, the invention concerns a calcium fortified α-lactalbumin enriched whey protein concentrate (α-lac WPC), wherein at least 90% of the proteins' calcium binding sites are occupied by calcium ions.

According to one embodiment, the percentage calcium in the calcium fortified α-lactalbumin enriched whey protein concentrate (α-lac WPC) that is in the protein bound state is at least 68%, preferably 75%, preferably at least 80%.

According to an embodiment of the invention, the measurement of percentage protein bound calcium is carried out at a protein concentration of 1% w/w in a 2 mM calcium solution.

According to another embodiment of the invention, the aforesaid calcium fortified α-lac WPC has a calcium content of 200-600 mg/100 g of calcium fortified α-lac WPC.

According to another embodiment of the invention, the aforesaid calcium fortified α-lac WPC has a percentage of α-lac that is greater than the percentage of β-lactoglobulin, preferably, the β-lactoglobulin concentration being less than the percentage of the α-lac content minus 7%.

According to another embodiment of the invention, in the aforesaid calcium fortified α-lac WPC, the phospholipid concentration is at least 3% w/w, preferably at least 4%.

According to another embodiment of the invention, the aforesaid calcium fortified α-lac WPC according to any of claims 1 to 5, is produced by:
 (i) providing an α-lac enriched WPC, wherein the α-lac is in the calcium depleted apo state, and then
 (ii) precipitating the apo form α-lac WPC
 (iii) mixing the apo form α-lac WPC obtained in step (ii) with a calcium salt.

In a second aspect, the invention concerns a nutritional composition comprising any of the aforementioned embodiments of the invention that is the calcium fortified α-lac WPC.

According to an embodiment of the invention, the aforesaid nutritional composition may be an infant formula (IF), including a premature IF, a starter IF (also known as stage 1 IF), follow-on infant formula (also known as stage 2 IF and may include stage 3 IF), or growing up milk (corresponding to generally, stages 3 and 4 IF), a nutritional supplement for an elderly patient, a nutritional supplement for a menopausal woman or a peri- or post-menopausal woman, or a nutritional composition for an animal, for example a pet food composition.

According to another embodiment of the invention, the aforesaid nutritional composition has a calcium content of 200-3200 mg/100 g.

According to an embodiment of the invention, the aforesaid nutritional composition has a calcium content of 260-750 mg/100 g, for example in the case of a stage 1 infant formula (0-6 months).

According to an embodiment of the invention, the aforesaid nutritional composition has a calcium content of 400-1000 mg/100 g, for example in the case of a stage 2 infant formula (6-12 months).

According to an embodiment of the invention, the aforesaid nutritional composition has a calcium content of 400-2750 mg/100 g, for example in the case of a stage 3 infant formula (12-36 months).

According to an embodiment of the invention, the aforesaid nutritional composition has a calcium content of 520-3200 mg/100 g, for example in the case of a stage 4 infant formula (3-8 years), otherwise known as a growing up milk (GUM).

According to an embodiment of the invention, the aforesaid nutritional composition has a calcium content of 260-750 mg/100 g, for example in the case of a nutritional composition for an elderly person or for a peri, -post or menopausal woman.

In a third aspect, the invention concerns a method for providing a calcium fortified α-lac WPC according to any of claims 1 to 6, comprising the following successive steps:
 (i) providing a WPC, wherein the α-lac is in the calcium depleted apo state,
 (ii) precipitating the apo form α-lac to provide an α-lac enriched WPC,
 (iii) mixing the apo form α-lac WPC obtained in step (ii) with a calcium salt.

According to another embodiment of the invention, the aforesaid method according to claim 11, wherein the calcium depletion to obtain the apo state α-lac is achieved by lowering the pH of a WPC solution to a pH of below 4.

According to another embodiment of the invention, the aforesaid method according to any of claims 11-12, wherein the calcium salt is chosen from one or more of the following calcium carbonate, calcium chloride, calcium gluconate, calcium hydroxide, calcium malate, calcium lactate, and calcium fumarate, calcium citrate malate, calcium lactate malate and calcium lactate citrate.

DETAILED DESCRIPTION OF THE INVENTION

Figure 1:
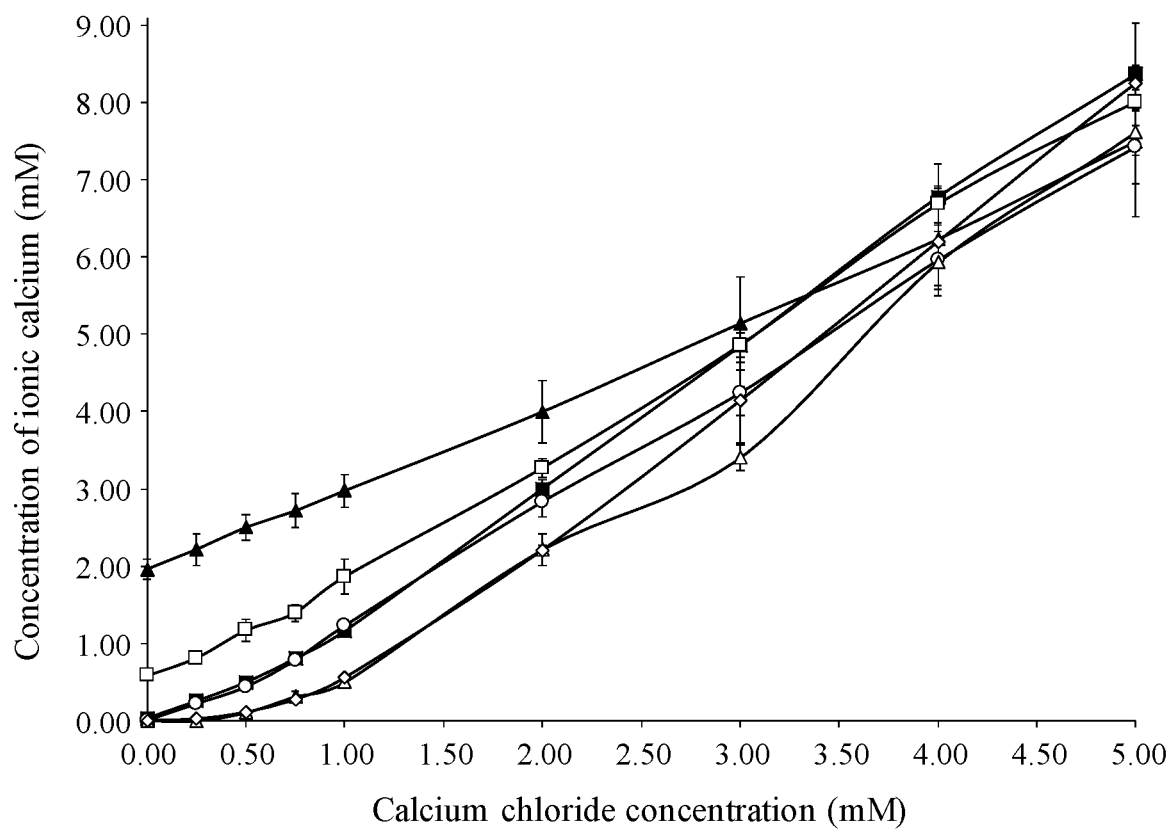
FIG. 1: Concentration of ionic calcium (mM) as a function of calcium chloride concentration (mM) for 1% protein solutions at pH 6.80 prepared from whey protein isolate (WPI; -■-), whey protein concentrate (WPC; -▲-), whey protein concentrate enriched in α-lactalbumin manufactured by membrane filtration (LAC-M; -□-), whey protein concentrate enriched in α-lactalbumin manufactured by selective protein precipitation original (LAC-P O; -Δ-), defatted whey protein concentrate enriched in α-lactalbumin manufactured by selective protein precipitation (LAC-P D; -◇-) and whey protein concentrate enriched in α-lactalbumin manufactured by ion-exchange (LAC-IE; -●-).

Any reference to prior art documents in this specification is not to be considered an admission that such prior art is widely known or forms part of the common general knowledge in the field.

As used in this specification, the words "comprises", "comprising", and similar words, are not to be interpreted in an exclusive or exhaustive sense. In other words, they are intended to mean "including, but not limited to".

As used herein, the term "nutritional composition" includes, but is not limited to, complete nutritional compositions, partial or incomplete nutritional compositions, nutritional supplements, and disease or condition specific nutritional compositions.

The term "nutritional supplement", or "dietary supplement", as used herein, refers to a nutritional product that provides nutrients to an individual that may otherwise not be consumed in sufficient quantities by said individual.

The term "food product", as used herein, refers to any kind of product that may be safely consumed by a human or animal. Said food product may be in solid, semi-solid or liquid form and may comprise one or more nutrients, foods or nutritional supplements. For instance, the food product may additionally comprise the following nutrients and micronutrients: a source of proteins, a source of lipids, a source of carbohydrates, vitamins and minerals. The composition may also contain anti-oxidants, stabilizers (when provided in solid form) or emulsifiers (when provided in liquid form).

The term "infant formula", as used herein, refers to a composition that is administered to infants and toddlers instead of, or, in addition to human milk. Infant formula (also known as "formula") is defined by the U.S. Federal Food, Drug, and Cosmetic Act (FFDCA) as "a food which purports to be or is represented for special dietary use solely as a food for infants by reason of its simulation of human milk or its suitability as a complete or partial substitute for human milk". It is also defined by the European Regulations, (COMMISSION DIRECTIVES, of 14 May 1991 on infant formulae and follow-on formulae (9 1/32 I/EEC)) and by guidelines issued by the Codex 15 Alimentarius STANDARD FOR INFANT FORMULA AND FORMULAS FOR SPECIAL MEDICAL PURPOSES INTENDED FOR INFANTS CODEX STAN 72-1981 Adopted as a worldwide Standard in 1981. Amendment: 1983, 1985, 1987, 2011 and 2015. Revision: 2007).

Infant formula may contain for example, cow's milk whey protein and casein as a protein source, a blend of vegetable oils as a fat source, lactose as a carbohydrate source, vitamin and mineral mixes, and other ingredients depending on the manufacturer. Infant formulas for infants who are allergic to other cow's milk proteins may contain soybean as a protein source in place of cow's milk, or may include partially or extensively hydrolysed cow's milk protein. Infant formulas may also be based on sheep, goat, camel or buffalo milk. Infant formulae may be especially formulated to meet the nutritional needs of infants in the first six months of life (starter formulas) or from six months onwards (follow-on formulas). Premature or low birthweight infants IF is also available for premature or low birthweight infants.

The term "Growing Up Milk" or "GUM" refers to (generally cow's) milk that has been fortified with iron or other minerals and vitamins; it is usually intended for administration to infants from the age of 12 months until they reach about 36 months.

The term "peri-menopausal woman" refers to a woman in the period of shortly before the occurrence of the menopause.

The inventors have developed a nutritional system that favours incorporation of relatively high amounts of calcium into dairy-based products, in particular, in a form that is bioavailable. Specifically, the inventors have accomplished this by fortifying a particular form of α-lactalbumin (α-lac) enriched whey protein concentrate (WPC) with calcium, in particular by mixing the former with at least one soluble calcium salt.

Thus, the inventors have identified and exploited the advantageous properties of a certain form of α-lac enriched whey protein concentrate (WPC) to incorporate calcium at high levels and thereby produce a calcium rich whey-based ingredient suitable for incorporation into the nutritional compositions.

α-Lactalbumin (α-Lac) Enriched Whey Protein Concentrate (WPC)

Whey proteins possess interesting nutritional, functional, physiological, and pharmaceutical properties. The proteins in whey are divided into two principal groups: 1) the globulin protein fraction containing mainly β-lactoglobulin (β-Ig) and immunoglobulins (Ig); and 2) the albumin fraction including α-lactalbumin (α-lac) and serum albumin. α-lac typically constitutes about 40% by weight of the total proteins in human milk, while cow's milk contains only about 4-5% α-lac by weight of the total proteins. β-Ig is not present in human milk.

α-lac is an important source of essential amino acids, such as tryptophan, lysine and cysteine. The human α-lac protein shares 72% of its amino acid sequence with bovine α-lac. Therefore, enrichment of bovine whey protein with α-lac, for use in nutritional formulations for infants and young children, can fulfil specific nutritional requirements in terms of the humanisation of infant formula, resulting in more complete compositional matching with human milk.

EP1455585 B1 discloses IF nutritional compositions comprising modified whey protein concentrate comprising specific amounts of α-lac and β-Ig. U.S. Pat. No. 6,312,755 describes processes for achieving high concentrations of α-lac in the treatment of bovine whey protein.

Industrial manufacture of α-lac enriched whey protein concentrate (α-lac WPC) can be achieved using different approaches known to the skilled person, such as membrane filtration, ion-exchange, selective protein precipitation, selective proteolysis, or a combination of these [Fox, P. F. (2001). *Milk proteins as food ingredients. International Journal of Dairy Technology.* 54, 41-55; Kamau, S. M., et al. (2010). *Alpha-Lactalbumin: Its Production Technologies and Bioactive Peptides.* Comprehensive Reviews in Food Science and Food Safety, 9(2), 197-212]. The enrichment of α-lac in whey protein ingredients by membrane filtration is made possible using membranes with different pore sizes in cascade (i.e., 300 kDa ultrafiltration (UF) followed by 30 kDa UF) in conjunction with charged membranes to selectively permeate α-lac. Ion-exchange technology-derived α-lac WPC is generally prepared using selective adsorption (anion exchange), or alternately by selective elution (cation exchange) at adjusted pH values far from the pI of α-lac.

The inventors have found that α-lac enriched whey protein concentrate (α-lac WPC) that has been produced, forming the apo form of α-lac, and then enriching the WPC, preferably by selective precipitation of this apo form of α-lac, may be then combined with calcium salts to yield an calcium fortified α-lac WPC with a very high calcium content. In particular, the proportion of calcium that is in the protein-bound form is greater than that found when using α-lac WPC produced by either ion exchange or membrane filtration methods. This protein-bound form of calcium has a higher bioavailability compared to calcium that is not associated with the protein in the α-lac WPC concentrate.

In particular, the inventors have found that α-lac enriched WPC that has been prepared by:
 (i) first achieving the calcium depleted apo state, optionally, by using calcium-binding salts and/or modifying pH, and then
 (ii) enriching the WPC in α-lac, preferably by precipitating the apo form α-lac leads to a surprisingly superior capacity of the thus produced α-lac to then bind exogenously added Ca, this capacity going beyond what one would expect.

Generally, the steps (i) and (ii) above may be performed by any means known to the skilled person. According to one embodiment of the invention, steps (i) and (ii) are performed according to the method described in U.S. Pat. No. 6,312,755, in particular column 4, lines 8-44. Briefly, the initial whey protein concentrate (WPC) starting product may be prepared in any conventional way. For example, the whey protein concentrate may be obtained from skimmed and/or clarified whey. The whey may be concentrated and/or desalted by common means, e.g., by ultrafiltration and/or diafiltration. For example, the starting material can be cheese or acid casein whey or the same whey concentrated through ultrafiltration using a 5-50K MWCO membrane to provide a whey protein concentrate having from about 30-80% protein on a solids basis.

Then, generally, in order to achieve calcium depletion of the WPC (step (i) above) to produce α-lac in the apo state, the pH of the unconcentrated or concentrated whey may be lowered to pH 4.0 or below. This may be achieved by mixing the WPC permeate obtained after the initial ultrafiltration or diafiltration step with a sufficient amount and concentration of acid to decrease the pH of the permeate to 4.0 or below. The pH is preferably lowered to a range of between about 3.3-3.8, with about 3.5 being most preferred. The acid is preferably a food grade acid, such as hydrochloric acid, phosphoric acid, citric acid, and sulfuric acid. The preferred acid is hydrochloric acid. Temperature is not critical in this step. This pH lowering step causes the calcium ions to disassociate from the α-lac molecules.

U.S. Pat. No. 6,312,755, column 4, lines 19-44, describes the further processing steps that may be used to obtain the α-lac WPC suitable as starting material for calcium fortification to produce the nutritional compositions according to embodiments of the present invention. These steps may be applied herein.

Briefly, the α-lac enriched WPC product is obtained, preferably, by precipitation of α-lac and other proteins induced by, for example, diluting the retentate with deionized water. It is indicated in U.S. Pat. No. 6,312,755, column 4: "The retentate is diluted until it contains from about 2-12% protein, and preferably from about 4-10% protein. The pH is then adjusted to a range of 4-5, and a preferred range of 4.5-4.7. Many alkali agents, such as NaOH and KOH, can be used for this purpose. The dilution and pH adjustment steps are performed in a temperature range of between about 10-55° C., preferably 25-40° C. The precipitation is normally complete within 2 hours."

According to an embodiment of the invention, step (i) calcium depletion of the α-lac may also be performed incubating the WPC with calcium depleting chelates at a pH where the calcium is preferentially bound by the chelating agents, compared to the protein.

According to an embodiment of the invention, after the formation of the α-lac enriched WPC in step (i), calcium fortification may take place in step (ii).

The (calcium fortified) α-lactalbumin enriched WPC, formed by the process described herein also serves as a source of protein, for example α-lactalbumin and β-lactoglobulin. The (calcium fortified) α-lactalbumin enriched WPC obtained may comprise α-lactalbumin in a concentration in the range of about 28% to 40% of the total protein, for example about 28% to 36% of total protein, and β-lactoglobulin in a concentration in the range of about 8% to about 33% of the total protein, for example 10% to about 29% of total protein. The percentage of α-lactalbumin in the α-lactalbumin enriched WPC is greater than the percentage of β-lactoglobulin, for example the β-lactoglobulin concentration is not greater than the percentage of the α-lactalbumin content minus 7%.

All percentages disclosed herein with respect to the (calcium fortified) α-lactalbumin enriched WPC are on a w/w basis unless stated otherwise.

Step (ii): Calcium Fortification of α-Lac WPC from Step (i)

The calcium fortified α-lac enriched WPC is generally produced by mixing the α-lac enriched WPC, in which the α-lac is in the apo-state (as described above), with a suitable source of calcium, in particular solutions or suspensions of soluble calcium salts.

The pH of the α-lac enriched WPC should be brought to above 5, preferably to above 6, and optimally in the range of 6.5-7 for the addition of calcium salts to ensure maximum calcium binding.

Soluble calcium salts may be chosen from inorganic or organic soluble salts. Preferred soluble calcium salts may be chosen from: calcium carbonate, calcium chloride, calcium gluconate, calcium hydroxide, calcium malate, calcium lactate, and calcium fumarate, or mixed salts such as calcium citrate malate, calcium lactate malate and calcium lactate citrate.

The solution of the soluble calcium salt may be provided in a concentration of, for example, 0.25-5 mM, preferably 1-4 mM, most preferably 2-3 mM.

According to a preferred embodiment of the invention, the α-lac enriched WPC may be mixed with a solution of a soluble calcium salt for a suitable length of time, for example for 30 minutes, or up to 2, or 3 or 4 hours or more.

Typically, this step is carried out at a pH of greater than 5, for example, in the range of 6-7, for example at a pH of 6.8. Typically, this step is carried out at a temperature of about 2°–16° C., preferably 4°–12° C., most preferably 4°–6° C.

Effect of the Calcium Fortified α-Lac Enriched WPC

The inventors have discovered that by choosing a specific type of α-lac enriched WPC allows them to achieve high percentages of protein bound calcium. These levels are surprisingly high and are not achieved when using α-lac enriched WPC produced by, either membrane filtration or ion-exchange methods.

Indeed, mixing the α-lac WPC, wherein the α-lac is in the apo state (as described according to step (i) above) with a Ca salt solution results in a Ca-enriched α-lac WPC having a higher percentage of protein-bound calcium/total calcium compared to that obtained for WPCs obtained by mixing the same Ca salt solution with any of:
  unmodified WPC,
  whey protein isolate (WPI),
  α-lac WPC produced by ion exchange methods (α-lac WPC IE), or
  α-lac WPC produced by membrane filtration methods (α-lac WPC M).

Thus, the apo-α-lac enriched WPC produced by precipitation, proves to be a surprisingly efficient starting material for further calcium enrichment.

Example 1 describes a set of experiments that compare and characterize the nutritional whey-based products fortified with calcium produced using three different α-lac enriched WPC starting materials, LAC-M (obtained by membrane filtration), LAC-P (obtained by precipitation of the calcium-depleted apo form according to the method described in U.S. Pat. No. 6,312,755, column 4, lines 8-44)

and LAC-IE (obtained by ion exchange). An additional sample of defatted LAC-P-D was also included for analysis.

The example indicates that differences in protein profile and physical state of α-lac enriched WPC ingredients strongly influence the affinity for, and binding of, ionic calcium added, by the protein ingredients.

Measurement of ionic calcium and titration with $CaCl_2$) in Example 1 demonstrated that LAC-P ingredient according to one embodiment of the invention had higher $Ca^{2+}$-binding ability than those in the WPI, WPC, LAC-M and LAC-IE ingredients, regardless of whether phospholipids are present or not.

Interestingly, initial $[Ca^{2+}]$ (i.e., innate $[Ca^{2+}]$) for LAC-M and WPC (0.58 and 1.96 mM respectively) were significantly higher (p<0.05) than the other samples. An increase in $[Ca^{2+}]$ was measured with increasing $CaCl_2$) addition for all the ingredients, the relationship between $[Ca^{2+}]$ and added $CaCl_2$) concentrations was close to linear for samples WPC, WPI, LAC-M and LAC-IE (FIG. 1); while in contrast, LAC-P displayed considerably less linear (more concave) increases in $[Ca^{2+}]$ as a function of added $CaCl_2$), suggesting that the proteins in the LAC-P ingredient had higher $Ca^{2+}$-binding ability than those in the WPI, WPC, LAC-M and LAC-IE ingredients. The LAC-P ingredient, in its original (LAC-P O) and defatted (LAC-P D) states, displayed very similar relationships between $[Ca^{2+}]$ and $CaCl_2$), indicating that the fat/phospholipid (PLs) material did not significantly influence $Ca^{2+}$ binding.

Figure 2:
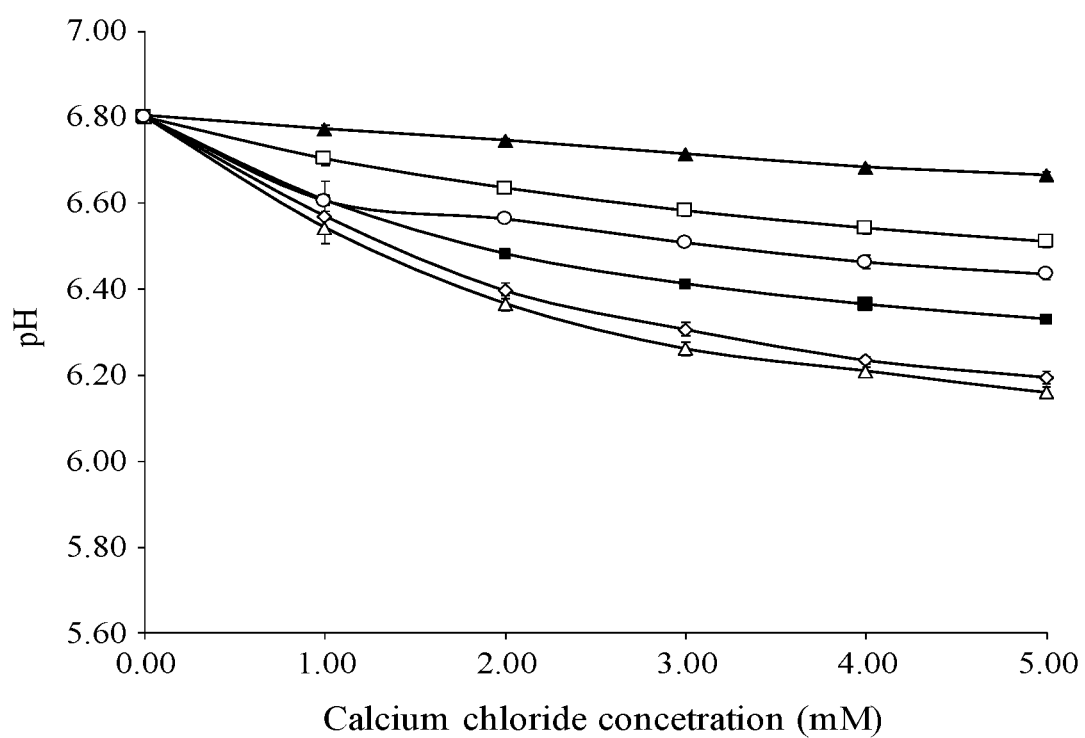
FIG. 2: pH as a function of calcium chloride concentration (mM) for 1% protein solution at pH 6.80 prepared from whey protein isolate (WPI; -■-), whey protein concentrate (WPC; -▲-), whey protein concentrate enriched in α-lactalbumin manufactured by membrane filtration (LAC-M; -□-), whey protein concentrate enriched in α-lactalbumin manufactured by selective protein precipitation original (LAC-P O; -Δ-), defatted whey protein concentrate enriched in α-lactalbumin manufactured by selective protein precipitation (LAC-P D; -◇-) and whey protein concentrate enriched in α-lactalbumin manufactured by ion-exchange (LAC-IE; -●-).

In general, the addition of soluble calcium salts (e.g., $CaCl_2$)) to protein solutions decreases the pH, due to the release of hydrogen ions as a consequence of the interactions between proteins and ions and also due to formation of calcium phosphate followed by release of hydrogen ions. The inventors also observed this (see FIG. 2) as the LAC-P ingredients showed the greatest ΔpH among all the samples.

Figure 3:
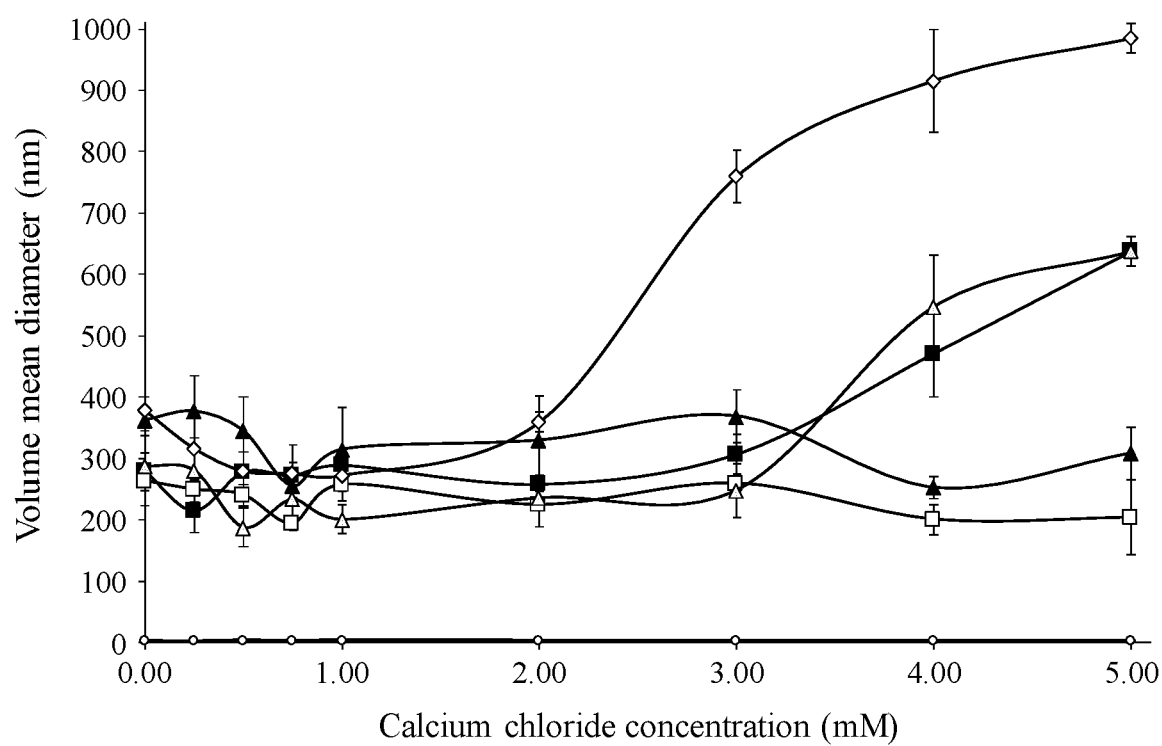
FIG. 3: Volume mean diameter of particle as a function of calcium chloride concentration (mM) for 1% protein solution at pH 6.80 prepared from whey protein isolate (WPI; -■-), whey protein concentrate (WPC; -▲-), whey protein concentrate enriched in α-lactalbumin manufactured by membrane filtration (LAC-M; -□-), whey protein concentrate enriched in α-lactalbumin manufactured by selective protein precipitation original (LAC-P O; -Δ-), defatted whey protein concentrate enriched in α-lactalbumin manufactured by selective protein precipitation (LAC-P D; -◇-) and whey protein concentrate enriched in α-lactalbumin manufactured by ion-exchange (LAC-IE.

The data for particle size distribution (PSD) parameters, including the volume mean diameter (VMD), as measured using dynamic light scattering (DLS), of the protein solutions as a function of $[CaCl_2]$, are reported in FIG. 3.

At zero added $CaCl_2$), the PSD and VMD values for WPI were similar to those reported previously. A bimodal PSD (i.e., peak 1 corresponding to smaller size material and peak 2 to larger size material) was observed for all the ingredients, except LAC-IE, which had a monomodal PSD.

The VMD (FIG. 3) of the samples remained essentially unchanged in the range from 0 to 2 mM of $CaCl_2$). At $CaCl_2$) concentration of greater than 3 mM, the VMD increased markedly for LAC-P D, followed by WPI and LAC-P O. The removal of fat and PL material (i.e., LAC-P-D) resulted in larger average volume diameter of the particle at $CaCl_2$) concentration greater than 2 mM, compared to LAC-P O. This stabilising effect of phospholipids (PLs) on the particle size of proteins can be attributed to the interactions between whey proteins and PLs.

Isothermal titration calorimetry (ITC) was used to better understand and quantify the thermodynamic properties of $Ca^{2+}$-binding by the protein ingredients in this study. ITC determines the thermodynamic properties of such interactions by measuring the heat flow produced when the ligand (i.e., Ca from $CaCl_2$)) is bound to a specific site of the protein, at constant temperature (i.e., 25° C.). The thermodynamic constants obtained (i.e., ΔG, ΔH, -TΔS, Kd, N) are displayed in Table 1 in Example 1.

The ingredients WPI, WPC and LAC-M had positive enthalpy (ΔH) and negative entropy (-TΔS) with values of 70.1, 22.2, 80.6 kcal/mol for ΔH and -86.3, -27.7 and -86.0 kcal/mol for -TΔS, respectively. In contrast, the values of ΔH determined for LAC-P O, LAC-P D and LAC-IE were significantly different (p<0.05), with values of -17.4, -28.3, -2.02 kcal/mol and -TΔS values of 8.24, 19.1 and -4.69 kcal/mol, respectively. These results confirmed high affinity and binding for $Ca^{2+}$ by the LAC-P ingredient in both versions (i.e., LAC P-O and LAC P-D); without being bound by theory, the interaction between Ca and proteins in LAC-P is likely attributed to the apo-state of α-lac which bound $Ca^{2+}$. Weaker affinity for $Ca^{2+}$ was observed for LAC-IE, in line with titration thermographs (data not shown) as endothermic peaks at the initial injections were seen.

The Ca content of the 1% w/v protein solutions with 2 mM added $CaCl_2$) was determined by atomic absorption spectroscopy (AAS), before and after filtration through 10 kDa MWCO filters (Table 1).

The LAC-P O and LAC-P D displayed the highest proportion of total Ca-bound by the protein, with values of 81.8 and 69.4%, respectively. The results are in agreement with ITC data, as different affinity constant (Kd) and stoichiometry (N).

Thus, the calcium fortified α-lac enriched WPC, whether in its original form or its defatted (stripped of phospholipids) form provides the highest proportion of protein bound calcium.

Thus, the calcium fortified α-lac enriched WPC according to the invention generally provides calcium having superior bioavailability compared to calcium provided in forms that are not bound to protein. This superior calcium bioavailability is important in maintaining healthy growth of and development of infants and young children. It is also important in delivering calcium to elderly patients, for example to peri- or post-menopausal women, as well as menopausal women.

Thus, the inventors have provided a nutrient rich whey based nutritional composition that has many nutritional advantages, in particular, for infants, young children, due to the α-lac enrichment as well as the high calcium content, in particular, the high percentage of calcium in the protein bound form. The calcium fortified α-lac enriched WPC may be introduced into IF and GUMs as a nutrient rich ingredient.

Several nutritional and physiological benefits have been associated with α-lac enrichment in IF through clinical trials, as similarities have been found between breast and IMF-fed infants regarding growth parameters (i.e., weight gain and anthropometry measurement), gastrointestinal tolerance (i.e., digestibility, reduced allergenicity and improved gut flora) and hormonal regulation (i.e., serotonin regulation). Moreover, increasing α-lac level also considerably modifies functional properties of WPC as its inclusion results in increased heat stability, decreased viscosity and reduced protein-protein interactions, properties critical during the formulation and processing of nutritional products (Buggy, A. K. (2017a). *Stabilising effect of α-lactalbumin on concentrated infant milk formula emulsions heat treated pre-or post-homogenisation.* 965 Dairy Science and Technology. 96, 845-859).

The increased proportion of protein bound Ca in the calcium fortified α-lac enriched WPC produced by the inventors means that the ingredient may deliver calcium to the infant or young child in form that has a higher bioavailability compared to calcium delivered in a form not bound to protein, for example, simply as a soluble salt present in an IF formulation.

As discussed above, the absorption of the calcium provided to the infant or young child is the key determinant in meeting daily calcium requirements. The compositions provided herein enable calcium to be delivered to the infant or young child in a form that may be absorbed and thus daily intake requirements may be met.

It is also hypothesized by the inventors that the form of protein bound calcium that is provided in the calcium fortified α-lac enriched WPC of the invention may provide better stability in the powder nutritional composition, for example in an infant formula without negatively impacting the organoleptic properties of the compositions.

Nutritional Products Comprising the Calcium Fortified α-Lac Enriched WPC

Delivering higher calcium amounts and in its best, i.e. bioavailable, form is indeed of critical importance during the youngest phase of development for infants.

The claimed calcium fortified α-lac enriched WPC may also be of use in the context of pet nutrition, and especially for nutritional compositions for young pets, especially at an early age of growth and development.

Nutritional compositions including the calcium fortified α-lac enriched WPC that has been described above, typically include infant formula (IF), including IF for premature/low birthweight infants, starter IF, follow-on IF and growing up milk (GUM).

Further non limiting examples of synthetic nutritional compositions for an infant or child are a composition for infants that is intended to be added or diluted with human breast milk, or a food stuff intended for consumption by an infant and/or child either alone or in combination with human breast milk.

The calcium fortified α-lac enriched WPC may, for example, be used in an amount sufficient to provide 1 g to 1.2 g of protein per 100 available kilocalories equating to 0.28 to 0.48 g of α-lactalbumin per 100 available kilocalories or 1.88 to 3.23 g of α-lactalbumin/L.

According to one embodiment of the invention, there is provided a synthetic nutritional composition for an infant or child comprising a calcium fortified α-lac enriched WPC obtained as disclosed herein.

In an embodiment, the synthetic nutritional composition comprises the calcium fortified α-lac enriched WPC in a concentration within a range of 0.8 to 10 g/L for example 0.8 to 8, 0.8 to 5 g/L, 0.85 to 4.5 g/L, 3 to 4.5 g/L.

In another embodiment of the present invention, the composition also comprises α-lactalbumin in a concentration within a range found in human breast milk for example in a range of 1.6 to 3.8 g/L, for example 1.7 to 3 g/L.

A goal of infant formula manufacturers is to mimic the composition of human breast milk. However, the composition of human breast milk is extremely dynamic and changes over time. For this reason, synthetic nutritional compositions for infants or children are usually stage based with a particular stage being suitable for use in infants or children falling within a particular age range e.g., stage 1 may be aimed at infants of 0 to 6 months, stage 2 may be aimed at infants of 6 months to 12 months, stage 3 may be aimed at children of 12 to 36 months, stage 4 may be aimed at children of 3 to 8 years. Each stage is formulated so that its composition is considered nutritionally sound with respect to the age range of the infant or child to whom it is directed.

Generally powdered compositions for infants, for example infant formula are often provided as powder; in that case they are reconstituted with water at a value of about 8.5 g per 60 ml of solution. Thus the content of calcium fortified α-lac enriched WPC and of calcium may be expressed in g/L or mg/L respectively.

In an embodiment of the present invention, there is provided a synthetic nutritional composition for an infant or child comprising 9 to 10 g/L of the calcium fortified α-lac enriched WPC used in the invention for example 9.5-10.2 g/L. In an embodiment, said composition is formulated for an infant of 0 to 6 months. In a more specific embodiment, the total concentration of calcium in said composition is at least 400/L and more specifically in a range of 400 to 1000 mg/L, even more specifically in a range of 600 to 800 mg/L.

In another embodiment of the present invention, there is provided a synthetic nutritional composition for an infant or child comprising 4 to 5 g/L of the calcium fortified α-lac enriched WPC used in the invention. In an embodiment, said composition is formulated for an infant of 6 to 12 months. In a more specific embodiment, the total concentration of calcium in said composition is at least 600 mg/L and more specifically in a range of 600 to 1350 mg/L, even more specifically in a range of 800 to 1200 mg/L.

In another embodiment of the present invention there is provided a synthetic nutritional composition for an infant or child comprising 3 to 4 g/L of the calcium fortified α-lac enriched WPC used in the invention. In an embodiment, said composition is formulated for a child of 12 to 36 months. In a more specific embodiment, the total concentration of calcium in said composition is at least 575 mg/L and more specifically in a range of 575 to 3880 mg/L, even more specifically in a range of 700 to 900 mg/L.

In another embodiment of the present invention, there is provided a synthetic nutritional composition for an infant or child comprising 0.5 to 1.5 g/L of the calcium fortified α-lac enriched WPC used in the invention. In an embodiment, said composition is formulated for a child of 3 to 8 years. In a more specific embodiment, the total concentration of calcium in said composition is at least 500 mg/L and more specifically in a range of 520 to 3200 mg/L, even more specifically in a range of 600 to 2500 mg/L.

The synthetic nutritional composition for an infant or child can also comprise any other ingredients or excipients known to be employed in the type of synthetic nutritional composition in question e.g. infant formula.

Non limiting examples of such ingredients include: other proteins, amino acids, carbohydrates, oligosaccharides, lipids, prebiotics or probiotics, essential fatty acids, nucleotides, nucleosides, vitamins, minerals and other micronutrients. Other suitable and desirable ingredients of synthetic nutritional compositions, that may be employed in the synthetic nutritional compositions for infants or children are described in guidelines issued by the Codex Alimentarius with respect to the type of synthetic nutritional composition in question e.g. Infant formula, growing up milk, HM fortifier, follow on formula, or food stuffs intended for consumption by infants e.g. complementary foods.

The calcium fortified α-lac enriched WPC may be added to a synthetic nutritional composition for an infant or young child by simply mixing it with other ingredients included in the composition.

α-lactalbumin is rich in essential and conditionally essential amino acids. Accordingly, the calcium fortified α-lac enriched WPC of the invention is particularly suitable in low protein synthetic nutritional compositions for infants and children because for a minimal protein intake said infants and children still intake sufficient 30 amino acids to optimise growth and development i.e. be within standard growth curves e.g. WHO standard growth curves.

The calcium fortified α-lac enriched WPC used in the present invention and obtained by the process described herein contains a minimum amino acid concentration, in grams per 100 grams of total protein, as follows:

arginine 3.1; cysteine 1.4; histidine 1.6; isoleucine 1.0; leucine 5.3; lysine 3.9; methionine 0.3; phenylalanine; 1.2; threonine 3.2; tryptophan 1.5; tyrosine 0.9; and valine 1.0. Accordingly, it may not be necessary to add amino acids to the synthetic nutritional compositions for infants or children when using calcium fortified α-lac enriched WPC. The non-protein nitrogen content may be about 15% or less of total nitrogen. The total protein content may be between about 12.5% to about 95% for example 35% to 80% or 73% to 77%. The fat content may be about 15% or less. The ash content may be about 4.5% or less. In an embodiment, the synthetic nutritional composition is a low protein infant formula. A low protein infant formula will comprise less than 3.5 g of protein/100 kcal for example less than 2.5 g/100 kcal or less than 2 g/100 kcal. The low protein infant formula may be an infant formula formulated for an infant of up to 12 months of age, for example for an infant of 0 to 6 months of age, or an infant of 6 to 12 months of age.

The synthetic nutritional compositions for infants or children may be prepared by methods well known in the art for preparing the type of synthetic nutritional composition in question e.g. infant formulae, follow on formulae, a composition for infants that is intended to be added or diluted with HM e.g. HM fortifier, or food stuffs intended for consumption by infants either alone or in combination with HM e.g. complementary foods.

An infant formula may for example be prepared by blending appropriate quantities of the calcium fortified α-lac enriched WPC with skimmed milk, lactose, vegetable oils and fat soluble vitamins in deionized water. These materials may be blended together in quantities sufficient to provide a final concentration of approximately 400 grams/liter. Additional (besides calcium) mineral salts may then be added to the mixture prior to a high temperature/short time pasteurization step. Appropriate additional mineral salts include sodium citrate, potassium hydroxide, potassium bicarbonate, magnesium chloride, ferrous sulfate, potassium citrate, zinc sulfate, copper sulfate, magnesium sulfate, potassium iodide, sodium selenite, etc. The mixture may then be homogenized and cooled. Heat-labile vitamins and micronutrients may then be added to the mixture. The mixture may then be standardized with deionized water to a final total solids concentration of about 120 to about 135 for example about 123 grams per litre, which is equivalent to about 670 kcal per litre. The formula may then be sterilized using a conventional ultrahigh temperature or standard retort process. This sterilized material may then be placed in appropriate packaging.

In another aspect of the present invention there is provided the use of the calcium fortified α-lac enriched WPC obtained as disclosed herein to provide an optimised amount of calcium to an infant or child.

Method to Produce Calcium Fortified α-Lac Enriched WPC

The invention also concerns methods to produce calcium fortified α-lac enriched WPC.

Generally, α-lac enriched WPC is produced according to the precipitation method described in the claims of U.S. Pat. No. 6,312,755 B1 and the α-lac enriched WPC is mixed with a calcium solution.

According to one embodiment of the invention, the α-lac enriched WPC may be produced according to the precipitation method comprising the following steps:

mixing a whey protein product with a sufficient amount of an acid such that the pH of the whey protein product is lowered to 4.0 or below, for example a pH in the range 3.3 to 3.8 such as pH 3.5;

fractionating the proteins in the acidified whey protein product to produce an α-lac enriched whey protein product by concentrating the proteins in the acidified whey protein product until the calcium to protein ratio is less than about 0.001 to form a low-calcium whey protein product; and precipitating the α-lac from the low-calcium whey protein product, said precipitating step including the substeps of:

diluting the low-calcium whey protein product;
adjusting the pH of the diluted low-calcium whey protein product to a range of between about 4.0-5.0 to form precipitated and soluble proteins; and separating the precipitated proteins from the soluble proteins, for example, by ultrafiltration e.g. through a 5K-50K molecular weight cut off membrane, and/or by diafiltration.

In the acidification step, the whey protein product may be acidified by the addition of an acid. The acid may be a food grade acid e.g. hydrochloric acid, phosphoric acid, citric acid, and/or sulfuric acid. If a whey protein powder is used as the whey protein product, this must be brought into solution prior to the acidification step. The whey protein product may be a whey protein concentrate prepared in any conventional way from mammalian whey (sweet or acid whey) for example cow, goat, sheep, buffalo, water buffalo, yak, human, llama and/or mouse whey. A whey protein concentrate may for example be obtained from skimmed and/or clarified bovine whey that has been concentrated and/or desalted by common means, e.g. by ultrafiltration (the whey protein product may be the retentate) and/or diafiltration.

Generally, the α-lac enriched WPC is in the precipitated fraction. This fraction may be further processed (for example spray dried) and stored for further use, or, alternatively it may be used immediately, without storage in step (ii) the calcium enrichment step, to produce the calcium enriched α-lac WPC.

If the α-lac enriched WPC (from step (i)) is supplied as a powder, then the protein powder is reconstituted in, for example water to 1% (w/v) protein content, using magnetic stirring at 350 rpm for at least 2 h, followed by holding at 4° C. for 18 h with continued stirring. In step (ii), the α-lac WPC obtained in step (i) as described above is mixed with a suitable source of calcium, in particular, solutions or suspensions of soluble calcium salts. For example, one may cite as suitable soluble calcium salts, calcium carbonate, calcium chloride, calcium gluconate, calcium hydroxide, calcium malate, calcium lactate, and calcium fumarate, or mixed salts such as calcium citrate malate, calcium lactate malate and calcium lactate citrate.

Nutritional Products Comprising the Calcium Fortified α-Lac Enriched WPC

The calcium fortified α-lac enriched WPC that the inventors have developed is suitable for inclusion in nutritional compositions, for example in infant formula (IF), including IF for premature/low birthweight infants, starter IF, follow-on IF and growing up milk (GUM).

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention is further described with reference to the following examples. It will be appreciated that the invention as claimed is not intended to be limited in any way by these examples.

EXAMPLES

Example 1: Comparative Tests on Different Spray-Dried α-Lactalbumin-Enriched WPC Ingredients Three spray-dried α-lactalbumin-enriched WPC (LAC) ingredients were obtained from three different manufacturers across the European Union and United States of America, manufactured in all cases from sweet whey. The protein content determined using the Kjeldahl method (Official Methods of Analysis. AOAC, 1994. Nitrogen (Total) in Milk 991.20), of LAC-M, LAC-P and LAC-IE powders was 78.8, 78.2 and 92.5% (w/w), respectively. The α-lactalbumin α-lac content of LAC-M, LAC-P and LAC-IE powders was 28.4, 24.4 and 73.4% (w/w), giving α-lac:β-lactoglobulin ratios of 1.72:1, 2.48:1 and 13.3:1, respectively. Regular whey protein isolate (WPI) and concentrate (WPC) ingredients were used as benchmarks and had 88.1 and 33.3% (w/w) protein, respectively, and α-lac contents of 20.4 and 4.36% (w/w), giving α-lac:β-Ig ratios of 0.24:1 and 0.28:1, respectively. The α-lac and β-Ig content was measured by reverse-phase high performance liquid chromatography using the method described by Jackson et al. [Jackson, J. G., Janszen, D. B., Lonnerdal, B., Lien, E. L., Pramuk, K. P., & Kuhlman, C. F. (2004). *A multinational study of α-lactalbumin concentrations in human milk*. Journal of Nutritional Biochemistry, 15(9), 517-521]. The enrichment of α-lac in these ingredients was achieved using membrane filtration, selective protein precipitation (according to the description in U.S. Pat. No. 66,312,755), and ion-exchange chromatography approaches for LAC-M, LAC-P and LAC-IE, respectively. The total Ca content of the ingredients was determined by inductively coupled plasma-mass spectrometry according to the method of Herwig et al. [Herwig, N., Stephan, K., Panne, U., Pritzkow, W., & Vogl, J. (2011). *Multi-element screening in milk and feed by SF-ICP-MS*. Food Chemistry, 124(3), 1223-1230]; WPC, WPI, LAC-M, LAC-P and LAC-IE had total calcium contents of 704, 82.6, 500, 3.58 and 198 mg/100 g, respectively. The fat content of the powders was determined using the Rose-Gottlieb method [Official Methods of Analysis AOAC, 2005. Total fat dried milk method 932.06], with WPC, WPI, LAC-M, LAC-P and LAC-IE having fat contents of 2.45, 0.59, 0.88, 9.32 and 0.36% w/w. A sub-sample of LAC-P was defatted according to the method described by Castro-Gómez et al. [Castro-Gómez, M. P., Rodriguez-Alcala, L. M., Calvo, M. V., Romero, J., Mendiola, J. A., Ibanez, E., & Fontecha, J. (2014). *Total milk fat extraction and quantification of polar and neutral lipids of cow, goat, and ewe milk by using a pressurized liquid system and chromatographic techniques*. Journal of Dairy Science, 97(11), 6719-6728], with some modifications. Briefly, powder was dispersed (5%, w/v) in a 2:1 dichloromethane/methanol solvent mixture at 25° C. and stirred for 20 min at 750 rpm, with the mixture being held quiescently for 25 min, after which the clarified organic solvent was decanted and filtered through Whatman filter paper grade 541 (GE Healthcare, Chicago, IL, USA). The extraction of fat was carried out three times for the same powder, after which the defatted material was dried using a laboratory scale Edwards Modulyo F101 freeze drier (Edwards, Crawley, UK). The fat content of the defatted LAC-P (LAC-P D) sample was 0.28% (w/w), as determined by Röse-Gottlieb. The total phospholipid (PLs) content of original LAC-P (LAC-P O) and LAC-P D was 4.68 and 0.36% (w/w), respectively, as determined according to the method of Braun et al. [Braun, M. (2010). *Quantification of phospholipids in infant formula and growing up milk by HPLC-737 ELSD*. Journal of AOAC International, 93(3), 948-955] using high performance liquid chromatography (Agilent 1100, Santa Clara, USA) equipped with an evaporative light scattering detector at 80° C. using a gas flow rate of 1 L/min. The protein powders were reconstituted in ultra-pure water to 1% (w/v) protein content, using magnetic stirring at 350 rpm for at least 2 h, followed by holding at 4° C. for 18 h with continued stirring. Prior to analysis, the pH of the protein solutions was adjusted to pH 6.80 using 0.5 M potassium hydroxide or 0.5 M hydrochloric acid. Ca was added, in the form of $CaCl_2$), to the whey protein solutions (1% w/v protein) at concentrations of 0.00, 0.25, 0.50, 147 0.75, 1.0, 2.0, 3.0, 4.0 and 5.0 mM. Unless otherwise stated, the pH of all Ca-fortified solutions was measured and re-adjusted to pH 6.80, if required. The reagents and standards used in this study were of analytical grade and purchased from Sigma Aldrich (Sigma-Aldrich, Arklow, Co. Wicklow, Ireland), unless otherwise stated.

Measurement of Ionic Calcium and Titration with Calcium Chloride

The ionic calcium concentration of the whey protein solutions (1%, w/v, protein pH 6.80) was measured using a Ca ion-selective polymer membrane electrode (Metrohm, Herisau, Switzerland) at 25° C. The ion-selective Ca probe was calibrated with standard Ca solutions at 0.00, 2.00, 4.00, 6.00, 8.00 and 10.0 mM at 25° C., by diluting a 1 M standard solution of $CaCl_2$) in ultra-pure water. The change in pH of the whey protein solutions (50 mL of 1% w/v protein, pH 6.80) on controlled addition (0.1 mL/min) of a $CaCl_2$) solution (0.5 M) was monitored by using an automated Metrohm ΔG 907 Titrando pH titration system (Metrohm, Herisau, Switzerland) equipped with a combined pH and temperature probe. Calibration of the pH probe was carried out using three standard buffer solutions with pH of 4.00, 7.00 and 9.00. Measurement of particle size distribution and zeta potential The particle size distribution of the whey protein solutions (1%, w/v, protein, pH 6.80) with added $CaCl_2$) was measured by dynamic light scattering (DLS) using a Zetasizer Nano-ZS (Malvern Instruments, Malvern, UK) as described by Mulcahy et al. [Mulcahy, E. M., Mulvihill, D. M., & O'Mahony, J. A. (2016). *Physicochemical properties of whey protein conjugated with starch hydrolysis products of different dextrose equivalent values*. International Dairy Journal, 53, 20-28] with some minor modifications. For analysis, each solution was diluted 1:100 in the respective whey protein-free calcium solution. A refractive index value of 1.45 was used for protein and the dispersant refractive index varied in response to differences in $CaCl_2$) concentration of the dispersant, ranging from 1.330 for 0.00 mM $CaCl_2$) (i.e., ultrapure water) to 1.332 for 5.00 mM $CaCl_2$), with the refractive index calculated using the Mie theory. The zeta ($\zeta$)-potential was measured at 25° C. for 120 s in automatic voltage mode, and $\zeta$-potential values was calculated using the 174 Smoluchowski model (Kirby & Hasselbrink, 2004).

Isothermal Titration Calorimetric Analysis of Calcium-Protein Interactions

The thermodynamic properties of interactions between whey proteins in solution (1%, w/v, protein, pH 6.80) and added $CaCl_2$) were determined using isothermal titration calorimetry (ITC) with a MicroCal PEAQ-ITC instrument (Malvern Instruments, Malvern, UK). Whey protein solutions were titrated with 5 mM $CaCl_2$), at 25° C. with stirring at 750 rpm. The reference cell was filled with ultra-pure water of the same volume (250 μL) as the sample cell. The titrant was injected step-wise into the whey protein solution at a volume of 0.1 µL, with a 150 s delay between successive injections and a total of 25 injections. The principle of the method is that the heat released or absorbed as a result of biomolecular binding is measured at constant temperature. The power applied to the reference cell was set at 10 µcal/s, in line with previous studies (Canabady-Rochelle and Mellema, 2010). The model used was "one binding site" to establish the stoichiometry (N), binding constant (Kf), Gibbs free energy ($\Delta G$), enthalpy ($\Delta H$) and entropy ($\Delta S$). Titration profiles of the different whey protein solutions were expressed as differential power (i.e., difference in power between the reference and sample cells) as a function of time.

Distribution of Calcium Between Protein-Bound and Free Forms

The total Ca content of the whey protein solutions (1%, w/v, protein, pH 6.80) was determined using flame atomic absorption spectroscopy (AAS) (SpectrAA, 55B, AAS, Varian) fitted with a Ca hollow cathode lamp (Activion, Halstead, Essex, England) in accordance with the International Dairy Federation Standard 119:2007 (IDF, 2007). The instrument was calibrated using standard solutions (0.00, 2.00, 4.00, 6.00, 8.00, 10.0 mg of Ca/L) prepared from a Ca reference solution (1000 mg/L) with 2% addition level of a 10% lanthanum chloride solution. $CaCl_2$ (2 mM) was added to the protein solutions and allowed to equilibrate for 20 min at 20° C. before the samples were centrifuged at 5,000 g for 25 min at 20° C. in Amicon® centrifugal filters (Merk Millipore, Carrigtohill, Co. Cork, Ireland) with a molecular weight cut-off of 10 kDa. Samples for AAS analysis had 24% trichloroacetic acid added in a ratio of 1:1, were allowed settle for 25 min, and filtered through No. 413 filter paper (VWR international, France). The samples analysed for Ca content using AAS were the initial Ca-fortified (i.e., 2.00 mM added $CaCl_2$)) protein solutions and the respective supernatant fractions from centrifugal filtration.

Statistical Data Analysis

All samples were prepared three times independently, and all analyses were performed in triplicate for each independent experiment. The data generated was subjected to one-way analysis of variance (ANOVA) using R i386 version 3.3.1 (R foundation for statistical computing, Vienna, Austria). A Tukey's paired-comparison post-hoc test was used to determinate statistically significant differences ($p<0.05$) between mean values for different samples, at the 95% confidence level. Results are expressed as mean value ±standard deviation, and statistically significant differences are identified in tables using superscript letters, unless otherwise stated.

TABLE 1

Results of comparative analysis of Example 1

| Sample | $\Delta G$ — | $\Delta H$ (kcal/mol) | $-T\Delta S$ — | Kd (—) | N (—) | Calcium content of protein solution (mg/L) | Calcium content of permeate (mg/L) | Proportion of total calcium bound by protein (%) |
|---|---|---|---|---|---|---|---|---|
| WPI | $-16.0 \pm 0.55^a$ | $70.1 \pm 0.01^e$ | $-86.3 \pm 0.11^a$ | $1.02 \times 10-4_{(d)}$ | $0.00 \pm 0.01^a$ | $100 \pm 1.15^b$ | $32.7 \pm 2.15^c$ | 67.4 |
| WPC | $-5.53 \pm 0.01^d$ | $22.2 \pm 0.25^d$ | $-27.7 \pm 0.25^b$ | $8.79 \times 10-5_{(c)}$ | $0.00 \pm 0.01^a$ | $205 \pm 1.69^e$ | $115 \pm 2.47^f$ | 43.9 |
| LAC-M | $-6.28 \pm 0.01^c$ | $80.6 \pm 1.21^f$ | $-86.0 \pm 0.27^a$ | $2.46 \times 10-5_{(b)}$ | $0.00 \pm 0.01^a$ | $146 \pm 1.45^d$ | $50.2 \pm 1.69^e$ | 65.6 |
| LAC-P O | $-9.30 \pm 0.05^b$ | $-17.4 \pm 0.05^b$ | $8.24 \pm 0.01^d$ | $1.63 \times 10-7_{(a)}$ | $0.71 \pm 0.01^d$ | $97.1 + 2.49^b$ | $17.6 \pm 1.14^a$ | 81.8 |
| LAC-P D | $-9.19 \pm 0.02^b$ | $-28.3 \pm 0.11^a$ | $19.1 \pm 0.11^e$ | $2.10 \times 10-7_{(a)}$ | $0.50 \pm 0.07^c$ | $89.2 \pm 1.10^a$ | $27.3 \pm 0.53^b$ | 69.4 |
| LAC-IE | $-6.70 \pm 0.01^c$ | $-2.02 \pm 0.02^c$ | $-4.69 \pm 0.07^c$ | $1.21 \times 10-4_{(e)}$ | $0.10 \pm 0.01^b$ | $110 \pm 2.85^c$ | $45.8 \pm 2.42^d$ | 58.6 |

Values followed by different superscript letters in the same column significantly different ($p < 0.05$)

*Calcium bound by protein expressed as: $\frac{\text{Ca solution} - \text{Ca permeate}}{\text{Ca solution} * 100} * 100$ Example 2

An example of the composition of an infant formula for use according to the present invention is given below. This composition is given by way of illustration only. The formula is produced according to the methods detailed in Example 3.

| Nutrient | Per 100 kcal | Per litre |
|---|---|---|
| Energy | 100 | 670 |
| Ca-fortified α-lac enriched WPC | 1.83 | 12.3 |
| Fat | 5.3 | 35.7 |
| Linoleic acid (g) | 0.79 | 5.3 |
| α-Linolenic acid (mg) | 101 | 675 |
| Lactose (g) | 11.2 | 74.7 |
| Prebiotic (100 % GOS) (g) | 0.64 | 4.3 |
| Minerals (g) | 0.37 | 2.5 |
| Na (mg) | 23 | 150 |
| K(mg) | 89 | 590 |
| Cl (mg) | 64 | 430 |
| Ca (mg) | 62 | 410 |
| P (mg) | 31 | 210 |
| Mg (mg) | 7 | 50 |
| Mn (µg) | 8 | 50 |
| Se (µg) | 2 | 13 |
| Vitamin A (µg RE) | 105 | 700 |
| Vitamin D (µg) | 1.5 | 10 |
| Vitamin E (mg TE) | 0.8 | 5.4 |
| Vitamin K1 (µg) | 8 | 54 |
| Vitamin C (mg) | 10 | 67 |
| Vitamin B1 (mg) | 0.07 | 0.47 |
| Vitamin B2 (mg) | 0.15 | 1.0 |
| Niacin (mg) | 1 | 6.7 |
| Vitamin B6 (mg) | 0.075 | 0.50 |
| Folic acid (µg) | 9 | 60 |
| Pantothenic acid (mg) | 0.45 | 3 |
| Vitamin B12 (µg) | 0.3 | 2 |
| Biotin (µg) | 2.2 | 15 |

-continued

| Nutrient | Per 100 kcal | Per litre |
|---|---|---|
| Choline (mg) | 10 | 67 |
| Fe (mg) | 1.2 | 8 |
| I (µg) | 15 | 100 |
| Cu (mg) | 0.06 | 0.4 |
| Zn (mg) | 0.75 | 5 |
| *Lactobacillus* GG | $2 \times 10^7$ cfu/g of powder | |

Example 3

Forty litre batches of formula were prepared as follows: one third of the lipid blend which was tempered at 45° C. in a separate vessel was first added to hot water (~75° C.) to reduce foaming upon addition of the macronutrient ingredients. The macronutrient ingredients in the order of Skimmed milk powder, Ca-fortified α-lac enriched WPC and lactose were then added individually at 5 min intervals, and mixed using a Silverson L4RT mixer (Silverson Machines Ltd., Chesham, England) followed by the remaining lipid blend. After 10 min of mixing, the pH of the mix was measured at 50° C. and adjusted (if required) to within the range 6.6-7.0 using either potassium hydroxide to increase the pH, or citric acid to decrease the pH. The mix was left mixing for 10 min prior to further processing.

The mix was thermally processed at 100° C.×30 s using a Microthermics (Model 25HV; North Carolina, USA) tubular heat exchanger and homogenised using an in-line two-stage valve homogeniser (Model NS20006H, GEA Niro, Soavi, Parma, Italy) using a first stage pressure of 13.8 MPa and a second stage of 3.45 MPa. The mix was held in storage overnight at a temperature of 4-8° C. with mixing using an overhead stirrer (Euro-ST digital, IKA®-Werke GmbH & Co. KG, Janke & Kunkel-Str. 10, 79219 Staufen, Germany) equipped with a propeller (3-blade, R1381 propeller, IKA®-Werke GmbH & Co. KG, Janke & Kunkel-Str. 10, 79219 Staufen, Germany) set to 30 rpm. Following overnight storage, the mix was pre-heated to 65° C. prior to spray drying using a pilot-scale Anhydro spray dryer (Model Plant No. 3 type I KA, Copenhagen, Denmark) with a typical water evaporation rate of 20 L/h. The dryer inlet temperature was held constant at 185° C. and outlet temperature was 90° C.

The invention claimed is:

1. A calcium fortified α-lactalbumin enriched whey protein concentrate (α-lac WPC), wherein at least 80% of calcium binding sites on proteins in the calcium fortified α-lactalbumin enriched whey protein concentrate (α-lac WPC) are occupied by calcium ions, at least 68% of the total calcium is bound by protein, and the calcium fortified α-lac WPC has a calcium content of 200-600 mg/100 g.

2. The calcium fortified α-lactalbumin enriched whey protein concentrate (α-lac WPC) according to claim 1, wherein measurement of percentage of the total calcium bound by protein is carried out at a protein concentration of 1% w/w in a 2 mM calcium solution.

3. The calcium fortified α-lac WPC according to claim 1, wherein the calcium fortified α-lac WPC comprises α-lactalbumin in a concentration of about 28% to 40% of the total protein and comprises β-lactoglobulin in a concentration of about 8% to about 33% of the total protein, and the concentration of the α-lactoglobulin is greater than the concentration of the β-lactoglobulin.

4. The calcium fortified α-lac WPC according to claim 1, wherein the phospholipid concentration is at least 3% w/w.

5. The calcium fortified α-lac WPC according to claim 1, wherein the calcium fortified α-lac WPC has been produced by:
   (i) providing an α-lac enriched WPC, wherein the α-lac is in the calcium depleted apo state, and then;
   (ii) precipitating the apo form α-lac WPC; and
   (iii) mixing the apo form α-lac WPC obtained in step (ii) with a calcium salt.

6. A nutritional composition comprising calcium fortified α-lac WPC, wherein at least 80% of calcium binding sites on proteins in the calcium fortified α-lactalbumin enriched whey protein concentrate (α-lac WPC) are occupied by calcium ions, at least 68% of the total calcium is bound by protein, and the nutritional composition has a calcium content of 400-3200 mg/100 g.

7. The nutritional composition according to claim 6, which is in a form selected from the group consisting of an infant formula, including a premature infant formula, starter infant formula, follow-on infant formula, and growing up milk, nutritional supplement for an elderly patient, a menopausal woman or a peri- or post-menopausal woman, and a pet food composition.

8. The nutritional composition according to claim 6, wherein the nutritional composition is an infant formula.

9. A method for providing a calcium fortified α-lac WPC comprising the following successive steps:
   (i) providing a WPC, wherein the α-lac is in the calcium depleted apo state;
   (ii) precipitating the apo form α-lac to provide an α-lac enriched WPC; and
   (iii) mixing the apo form α-lac WPC obtained in step (ii) with a calcium salt,
   wherein the calcium fortified α-lac WPC contains at least 68% of the total calcium bound by protein, and the calcium fortified α-lac WPC has a calcium content of 200-600 mg/100 g.

10. The method according to claim 9, wherein the calcium depletion to obtain the apo state α-lac is achieved by lowering the pH of a WPC solution to a pH of below 4.

11. The method according to claim 9, wherein the calcium salt is selected from the group consisting of calcium carbonate, calcium chloride, calcium gluconate, calcium hydroxide, calcium malate, calcium lactate, and calcium fumarate, calcium citrate malate, calcium lactate malate and calcium lactate citrate.

12. The nutritional composition according to claim 6, wherein the nutritional composition has a calcium content of 400-2750 mg/100 g.

13. The nutritional composition according to claim 6, wherein the nutritional composition has a calcium content of 400-1000 mg/100 g.

14. The nutritional composition according to claim 6, wherein the nutritional composition has a calcium content of 600-800 mg/100 g.

15. The nutritional composition according to claim 11, wherein the calcium salt is calcium chloride.

* * * * *